US012562511B2

(12) United States Patent
Wu et al.

(10) Patent No.: US 12,562,511 B2
(45) Date of Patent: Feb. 24, 2026

(54) WIRE CONNECTION TERMINAL STRUCTURE

(71) Applicants: SWITCHLAB INC., New Taipei City (TW); SWITCHLAB (SHANGHAI) CO., LTD., Shanghai City (CN); GAOCHENG ELECTRONICS CO., LTD., Shenzhen (CN)

(72) Inventors: Chih-Yuan Wu, New Taipei City (TW); Chih-Cheng Chen, New Taipei City (TW)

(73) Assignees: Switchlab Inc., New Taipei City (TW); Switchlab (Shanghai) Co., Ltd., Shanghai City (CN); Gaocheng Electronics Co., Ltd., Shenzhen (CN)

( * ) Notice: Subject to any disclaimer, the term of this patent is extended or adjusted under 35 U.S.C. 154(b) by 402 days.

(21) Appl. No.: 18/194,293

(22) Filed: Mar. 31, 2023

(65) Prior Publication Data

US 2023/0327346 A1 Oct. 12, 2023

(30) Foreign Application Priority Data

Apr. 8, 2022 (TW) ................................. 111113533

(51) Int. Cl.
*H01R 4/48* (2006.01)
*H01R 9/26* (2006.01)

(52) U.S. Cl.
CPC ............... *H01R 4/483* (2023.08); *H01R 9/26* (2013.01)

(58) Field of Classification Search
None
See application file for complete search history.

(56) References Cited

U.S. PATENT DOCUMENTS 10,367,276 B2 * 7/2019 Wu ........................ H01R 9/223
11,411,328 B2 * 8/2022 Stjepanovic ........... H01R 4/485

* cited by examiner

*Primary Examiner* — Ross N Gushi
(74) *Attorney, Agent, or Firm* — Rosenberg, Klein & Lee

(57) ABSTRACT

A wire connection terminal structure includes a case main body. Wire plug-in ports are connected with an electro-conductive module. Arcuate slide guide slots are disposed on the electro-conductive module. Rotary buttons are pivotally disposed in the case main body. Each rotary button has a movable section. A pin is disposed on the movable section. The pin is extended into the slide guide slot. At least one abutment leaf spring is pivotally disposed between the rotary button and the electro-conductive module. When a conductive wire passes through the wire plug-in port into the lateral side of the electro-conductive module, the rotary button can be driven to make the movable section gradually displace from a section of the abutment leaf spring near the pivotally rotational center to an outer lateral side. The abutment leaf spring is pushed to engage with the conductive wire.

22 Claims, 6 Drawing Sheets

WIRE CONNECTION TERMINAL STRUCTURE

BACKGROUND OF THE INVENTION

1. Field of the Invention

The present invention relates generally to an improved wire connection terminal structure, and more particularly to a wire connection terminal structure having better structural strength and capable of achieving precise and secure guide effect. Also, the operation of the wire connect ion terminal structure can be performed with less strength.

2. Description of the Related Art

Prior art discloses a connection apparatus for connecting an end section of a conductor, mainly including a case body and a bus section, a holding spring device and torque rod device disposed in the case body. At least two plug-in ports are disposed on a surface of the case body for the end sections of the conductive wires to plug in. Symmetrical slide slots are respectively disposed on lateral sides of the two plug-in ports. The torque rod device is pivotally disposed beside the slide slots. A controlling bending section protrudes from a circumference of the torque rod device. A pin is disposed on the controlling bending section for movably extending into the slide slots of the case body. The bus section is disposed between the two plug-in ports. Two slide slots with opposite openings are respectively disposed on two lateral sides of the bus section. The slide slots are respectively overlapped with end sections of the two slide slots of the case body near outer lateral side. A narrowest section is disposed beside the openings of the two slide slots of the bus section. The holding spring device is pivotally disposed between the slide slots of the case body and the plug-in ports via a spring support. The holding spring device has multiple leaf springs. Controlling support legs are respectively disposed at two end sections of the leaf springs near the torque rod device. In addition, holding support legs are respectively disposed at the two end sections of the leaf springs near the plug-in ports. When the end sections of the conductive wires are plugged through the plug-in ports into two lateral sides of the bus section, the torque rod device is pivotally rotated to drive the pin to move. At this time, the pin moves along the slide slots of the case body toward the rotational axis of the spring support. Also, the controlling bending section of the torque rod device presses the controlling support legs at one end of the leaf springs so as to drive the holding support legs at the other end of the leaf springs to abut against the end sections of the conductive wires. Accordingly, the end sections of the conductive wires tightly attach to the two lateral sides of the bus section into contact therewith. At the same time, the pin is inserted into the slide slots of the bus section and stopped by the narrowest sections of the slide slots to keep located. Therefore, it is ensured that the end sections of the two conductive wires are electrically connected with each other via the bus section.

However, in application, the above structure has some shortcomings as follows:

First, under limitation of the structural form of the internal space of the case body, the slide slot structure for guiding the pin can only slightly protrude from the inner wall of the case body. This increases the difficulty in configuration design and manufacturing of the case body. Moreover, the case body is made of plastic material so that the portions of the slide slots can hardly have better structural strength. As a result, due to improper operation or after a long period of use, the slide slots are apt to wear. This will lead to unsmooth operation or damage so that the torque rod device can hardly normally pivotally rotate. In this case, the torque rod device will fail to truly and securely drive the holding spring device to abut against and hold the end sections of the conductive wires. Second, during the process that the torque rod device drives the holding spring device to hold the end sections of the conductive wires, the moving path of the pin is such that the pin gradually gets close to the rotational axis of the spring support, whereby the arm of the abutment force applied by the controlling bending section to the controlling support legs for pivotally rotating the leaf springs is gradually shortened. As a result, it is necessary to gradually increase application force in operation. Moreover, when the holding support legs abut against the end sections of the conductive wires, an elastic reaction force is applied to the leaf springs so that it will be more laborious to operate the torque rod device. This leads to inconvenience in application as a shortcoming.

It is therefore tried by the applicant to provide a wire connection terminal structure to improve the practical shortcomings of the conventional connection apparatuses (wire connection terminals) for connecting with the end sections of the conductive wires.

SUMMARY OF THE INVENTION

It is therefore a primary object of the present invention to provide a wire connection terminal structure including a case main body, an electro-conductive module, a rotary button and an abutment leaf spring. Wire plug-in ports are disposed on a surface of the case main body. The electro-conductive module is connected with the wire plug-in ports. Arcuate slide guide slots (in closed form) are disposed on the electro-conductive module. The rotary button is pivotally disposed in the case main body via a first shaft rod to partially protrude out of the case main body. The rotary button has a movable section. A pin is disposed on the movable section. The pin is extended into the slide guide slot and freely movably guided by the slide guide slot. The abutment leaf spring is pivotally disposed between the rotary button and a lateral side of the electro-conductive module and drivable by the rotary button to pivotally rotate. When a conductive wire is plugged from outer side through the wire plug-in port into the lateral side of the electro-conductive module, the rotary button can be driven to make the movable section gradually move from a section of the abutment leaf spring near the pivotally rotational center to an outer lateral side. Accordingly, the arm of operation force is gradually increased and the abutment leaf spring is pushed to engage with the conductive wire, whereby the conductive wire can tightly attach to the electro-conductive module and electrically connect therewith. The above structure is such designed that the slide guide slot is disposed on the metal-made electro-conductive module so that the structural strength of the slide guide slot is enhanced and the pin can be more precisely and securely guided to smoothly move within the slide guide slot. Also, the lifetime of the terminal structure is prolonged and the complicatedness in arrangement of the structure of the internal space of the case main body is reduced.

It is a further object of the present invention to provide the above wire connection terminal structure, in which a middle section of the abutment leaf spring is formed with an arcuate bending section. The bending section is pivotally disposed in the case main body via a second shaft rod. A drive section proximal to the rotary button and an engagement section proximal to the electro-conductive module are respectively formed on two sides of the bending section. During the process that the rotary button drives the abutment leaf spring to engage with the conductive wire, the position where the movable section abuts against the drive section is gradually changed from a position near the bending section (or the second shaft rod) to a position near the outer end section of the drive section (away from the bending section). Therefore, the arm of the force applied by the movable section of the rotary button to the drive section of the abutment leaf spring for pivotally rotating the abutment leaf spring is gradually increased. Accordingly, the moving direction of the rotary button or the movable section is reverse to the moving direction of the abutment leaf springs or the drive section. Therefore, the operation can be performed with less strength.

It is still a further object of the present invention to provide the above wire connection terminal structure, in which the electro-conductive module is composed of an electro-conductive plate and lateral supports assembled on lateral sides of the electro-conductive plate. Each lateral support has a lateral socket in communication with the wire plug-in port. (Parallel) support sections are disposed on two sides of the lateral socket. The slide guide slots are formed on the support sections. In addition, a receiving space is defined in the lateral support for receiving the abutment leaf spring. In practice, the electro-conductive plate and the lateral support can be an integrally formed structure body or two components detachably assembled with each other. Therefore, the electro-conductive module can be manufactured in accordance with different processing manners and cost requirements. Also, the abutment leaf spring is received in the receiving space of the lateral support and effectively prevented from slipping out during the operation so as to ensure the assembling quality of the entire terminal structure.

The present invention can be best understood through the following description and accompanying drawings, wherein:

DETAILED DESCRIPTION OF THE PREFERRED EMBODIMENTS

Figure 1:
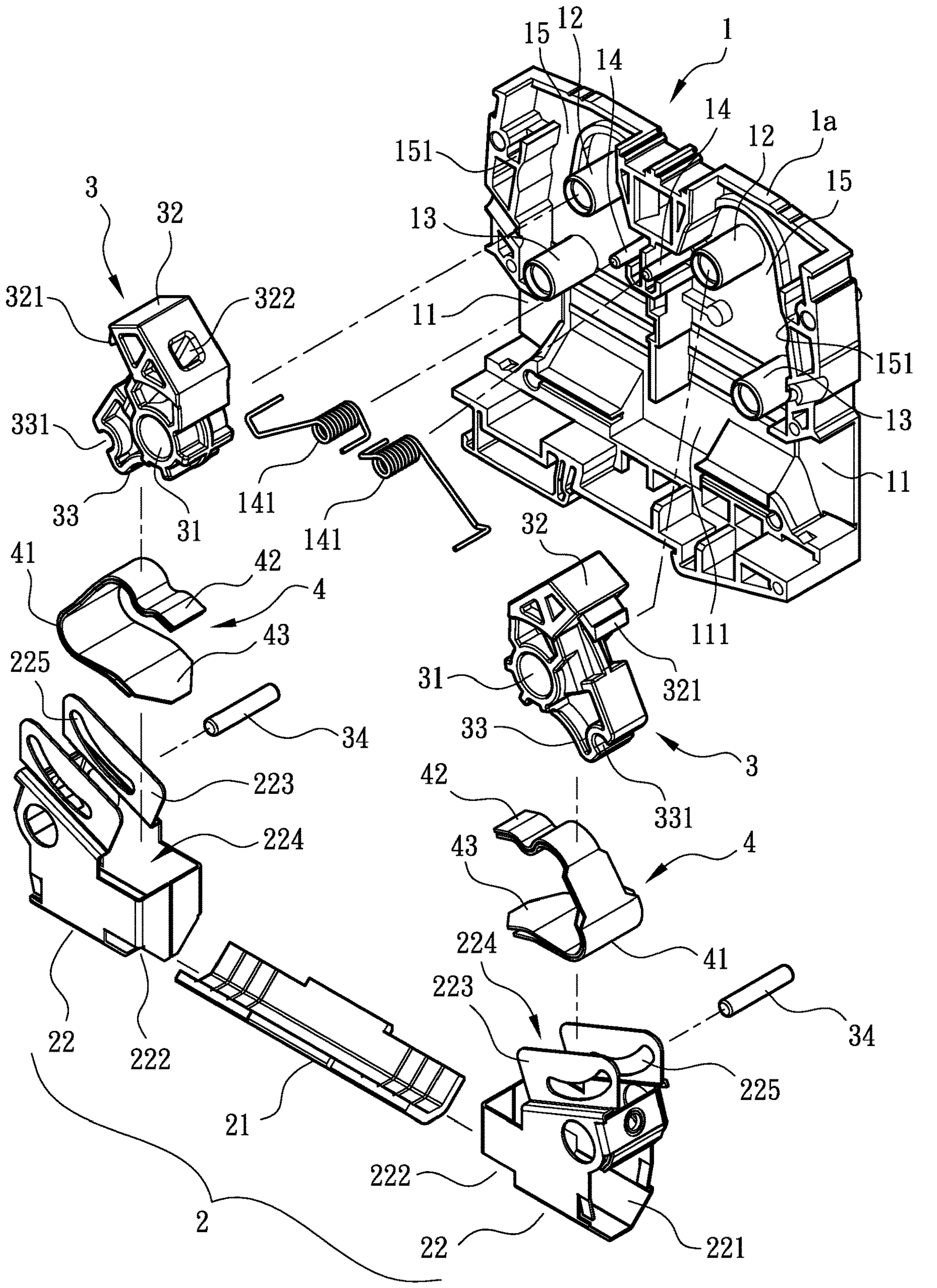
FIG. 1 is a perspective exploded view of a first embodiment of the present invention.
Figure 2:
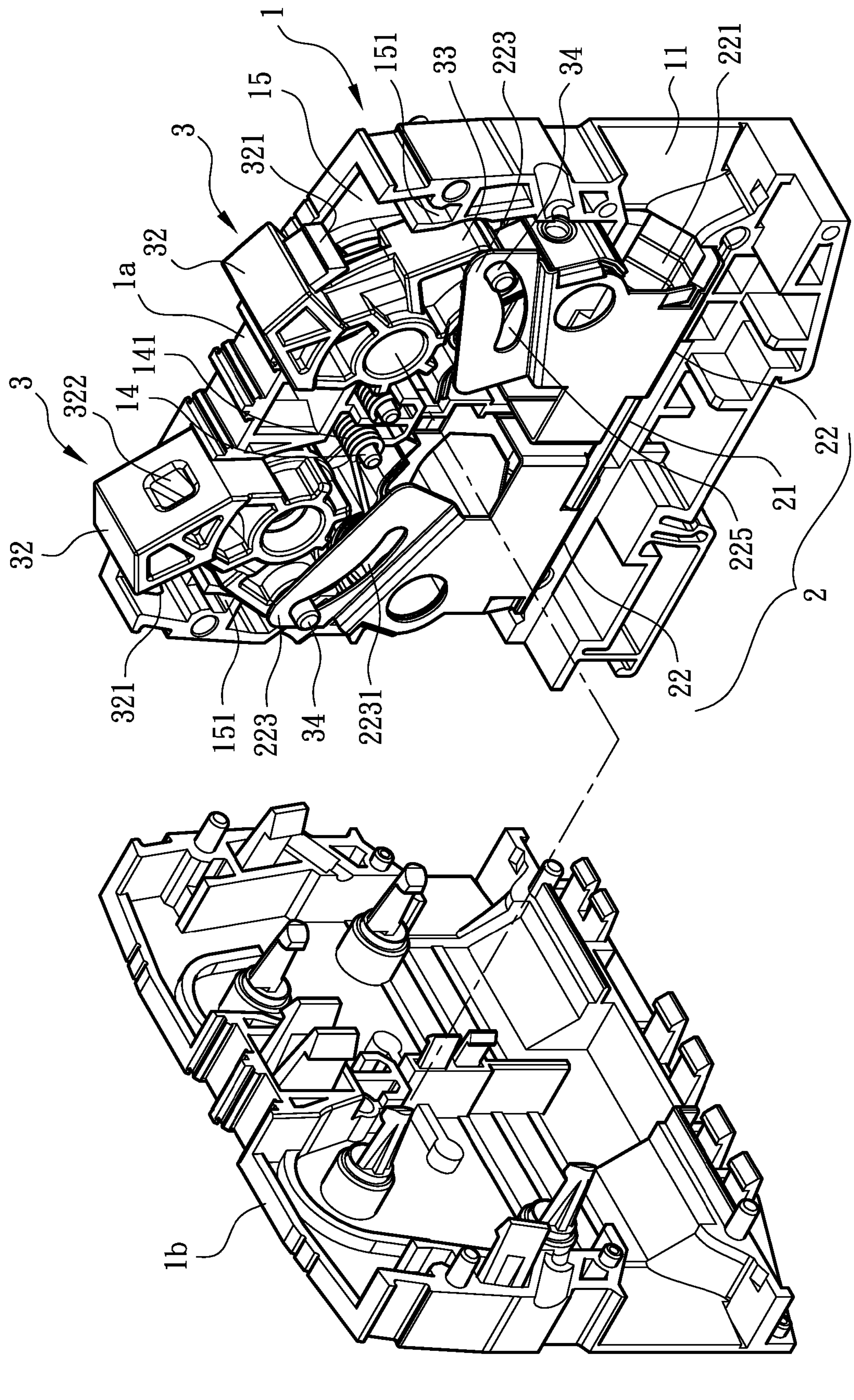
FIG. 2 is a perspective partially assembled view of the first embodiment of the present invention.
Figure 3:
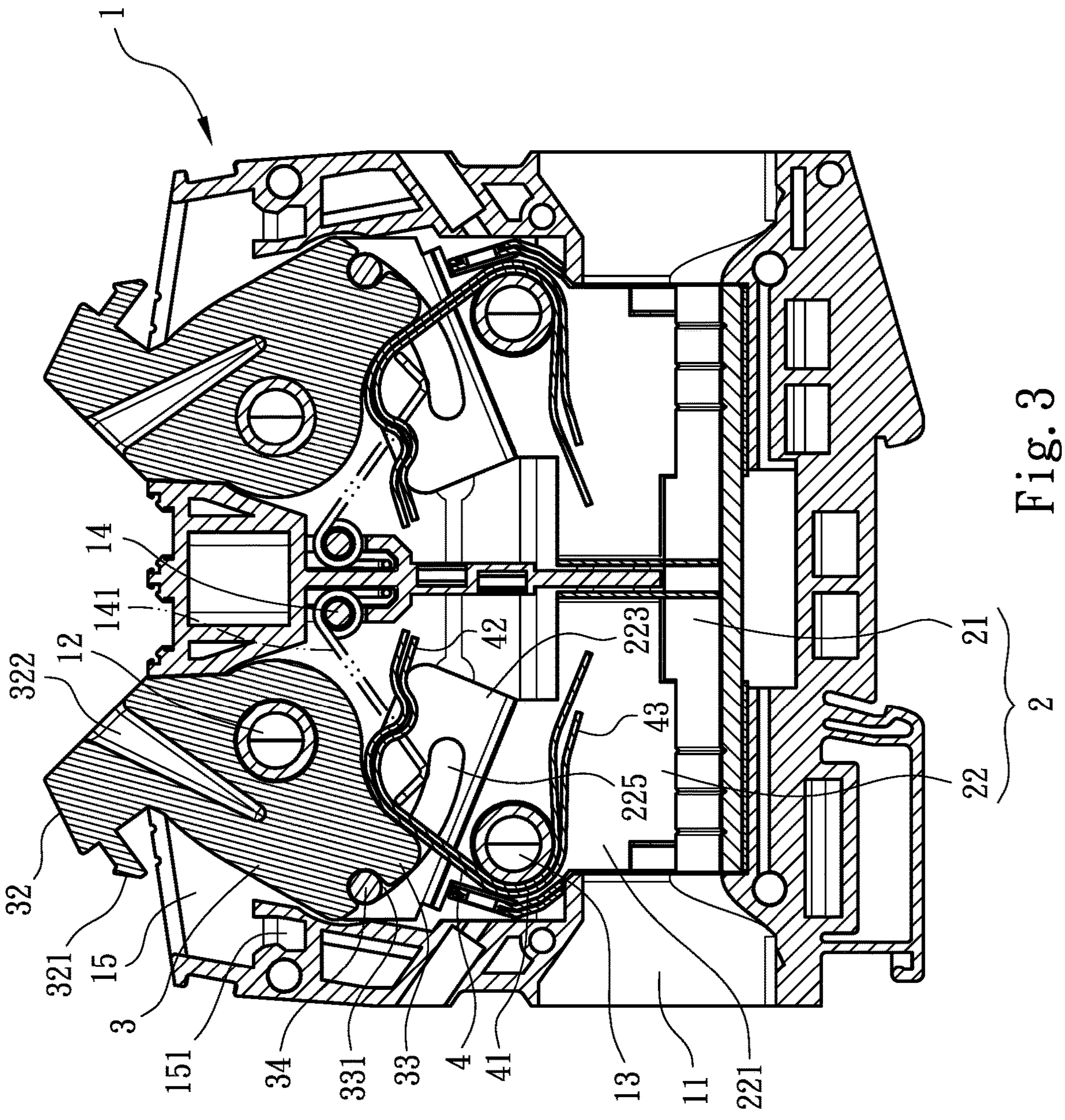
FIG. 3 is a sectional assembled view of the first embodiment of the present invention.

Please refer to FIGS. 1 to 3. According to a first embodiment, the wire connection terminal structure of the present invention includes a case main body 1, an electro-conductive module 2, a rotary button 3 and an abutment leaf spring 4. The case main body 1 is composed of two half case bodies 1*a*, 1*b* opposite to each other. A receiving section 111 and at least one recessed section 15 are formed in the case main body 1. The receiving section 111 has at least one wire plug-in port 11 open to outer side. In the recessed section 15 are disposed a first shaft rod 12, a second shaft rod 13, a support rod 14 and an insertion sink 151.

In practice, two wire plug-in ports 11 can be respectively disposed on two lateral sides of the receiving section 111 as necessary. In addition, two recessed sections 15 are disposed on a surface of the case main body 1 corresponding to each other. Two symmetrical first shaft rods 12, two symmetrical second shaft rods 13, two symmetrical support rods 14 and two symmetrical insertion sinks 151 are respectively disposed in the two recessed sections 15.

The electro-conductive module 2 is disposed in the receiving section 111. In a preferred embodiment, the electro-conductive module 2 is composed of an electro-conductive plate 21 and at least one lateral support 22 assembled on a lateral side of the electro-conductive plate 21. The lateral support 22 has a lateral socket 221 connected with the wire plug-in port 11. At least one (or two parallel) support sections 223 are disposed on two sides of the lateral socket 221. Two (symmetrical) slide guide slots 225 are (respectively) formed on the support sections 223. The slide guide slots 225 can have the form of a closed structure (or a partially open structure). In addition, a receiving space 224 is defined in the lateral support 22 in communication with the lateral socket 221.

In practice, the electro-conductive plate 21 and the lateral support 22 of the electro-conductive module 2 can be an integrally formed structure body. Alternatively, an opening 222 can be formed on the lateral support 22 in communication with the lateral socket 221. The lateral side of the electro-conductive plate 21 is fitted in the opening 222, whereby two lateral sides of the electro-conductive plate 21 can be extended into the lateral sockets 221 of the two lateral supports 22 and assembled therewith in accordance with the requirements of different structural designs or manufacturing cost.

The rotary button 3 has a shaft hole 31. The first shaft rod 12 in the recessed section 15 can be pivotally fitted in the shaft hole 31, whereby the rotary button 3 is pivotally rotatably assembled with the first shaft rod 12. The rotary button 3 further has a shift section 32 exposed to outer side of the case main body 1 and a movable section 33 extending to one side of the electro-conductive module 2. An outward protruding hook section 321 and an inward recessed insertion socket 322 are disposed on the shift section 32. A holding channel 331 is formed on the movable section 33 for holding a pin 34. The pin 34 can extend into the slide guide slots 225 on the same side to be freely movably guided within the slide guide slots 225. In addition, an elastic member 141 is disposed on the support rod 14 for elastically abutting against the rotary button 3 to make the shift section 32 protrude out of the case main body 1.

In practice, two rotary buttons 3 are respectively disposed in the two recessed sections 15 of the case main body 1. The two rotary buttons 3 are symmetrically disposed in the recessed sections 15.

The abutment leaf spring 4 (or a set of abutment leaf springs) is disposed in the receiving space 224 of the lateral supports 22. A middle section of each abutment leaf spring 4 is formed with an arcuate bending section 41. A drive section 42 proximal to the rotary button 3 and an engagement section 43 proximal to the electro-conductive module 2 are respectively formed at two ends of the bending section 41. When assembled, an inner side of the bending section 41 is pivotally fitted on the second shaft rod 13, whereby the second shaft rod 13 serves as a pivotally rotational shaft of the abutment leaf spring 4.

In practice, the abutment leaf spring 4 can be a set of abutment leaf springs composed of multiple overlapped abutment leaf springs with identical bending configuration. In addition, at least an outer end section of the engagement section 43 is formed with a forked structure.

Figure 5:
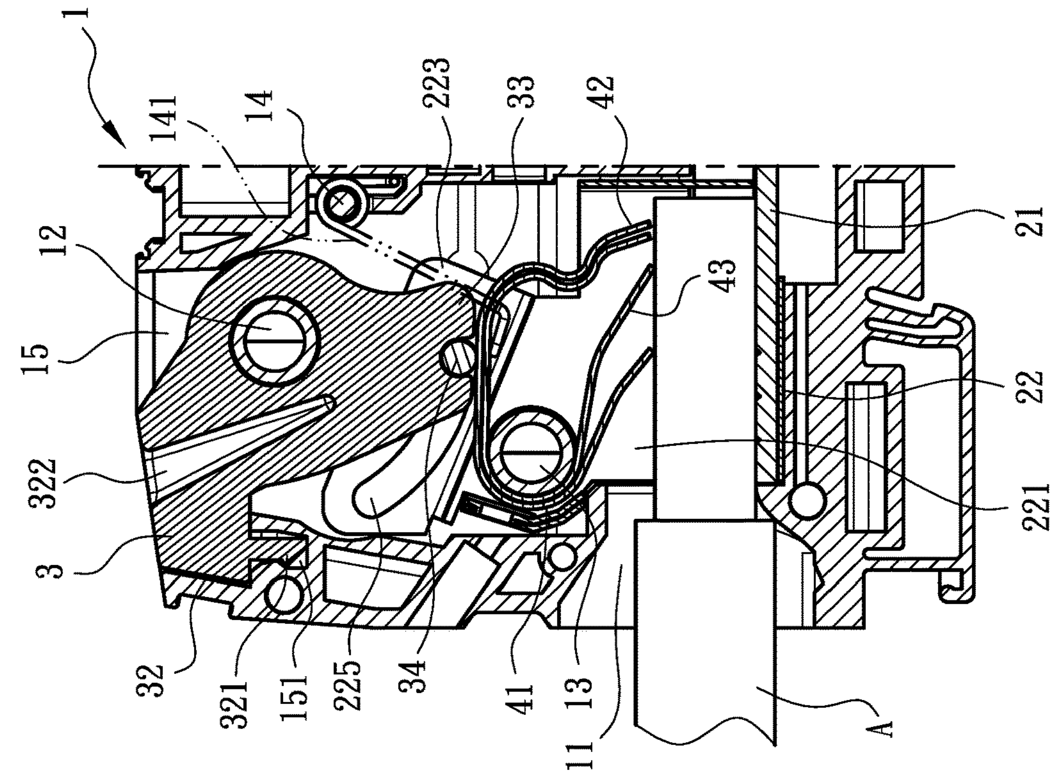
FIG. 5 is a sectional assembled view of the first embodiment of the present invention according to FIG. 3, showing that the rotary button is rotated to drive the abutment leaf spring to engage with the conductive wire.
Figure 4:
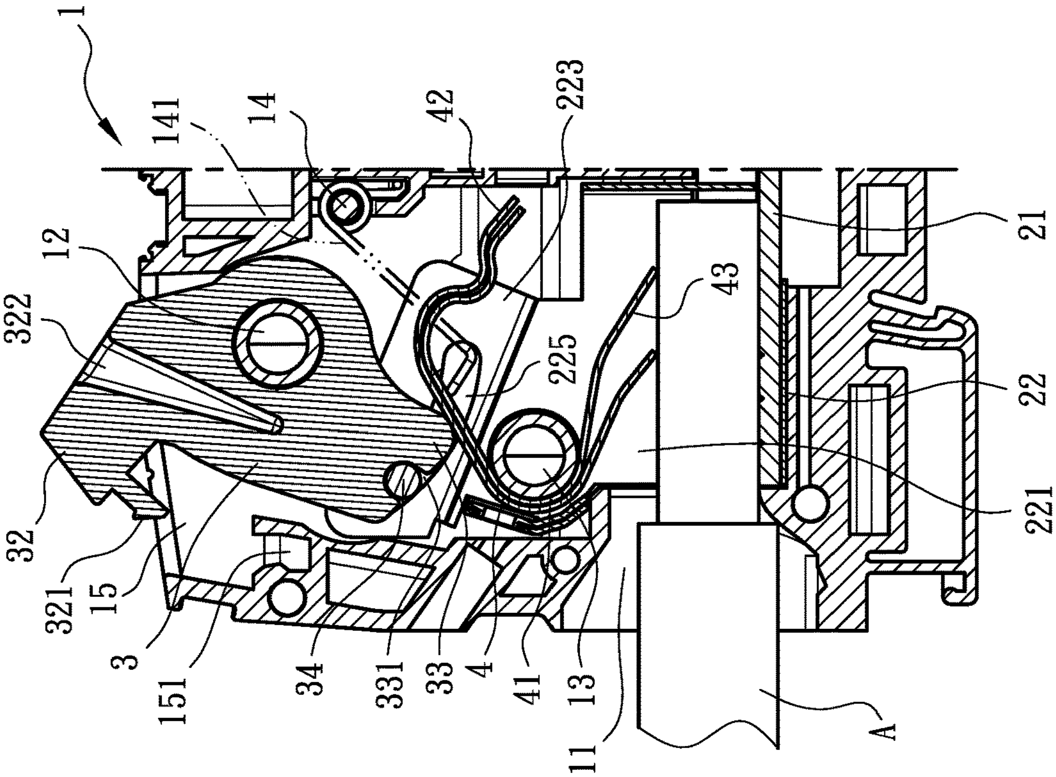
FIG. 4 is a sectional assembled view of the first embodiment of the present invention according to FIG. 3, showing that the conductive wire is plugged into the case main body and the rotary button is not yet rotated to drive the abutment leaf spring to engage with the conductive wire.

Please refer to FIGS. 4 and 5. In use of the wire connection terminal structure of the present invention, two conductive wires A are plugged from the outer side through the wire plug-in ports 11 into the lateral sockets 221 of the electro-conductive module 2. At this time, the shift section 32 of the rotary button 3 keeps protruding out of the case main body 1 and the movable section 33 (the pin 34) is in contact with a portion of the drive section 42 near the bending section 41 (as shown in FIG. 4).

Then, an operator can use a tool (such as a screwdriver) and extend the tool into the insertion socket 322 of the shift section 32 to drive and rotate the rotary button 3 (or directly drive and rotate the rotary button 3). Accordingly, the movable section 33 is gradually moved in a direction away from the bending section 41 (toward an outer end section of the drive section 42) to push the drive section 42 and pivotally rotate the abutment leaf spring 4. At the same time, the outer end section of the engagement section 43 at the other end is engaged with a surface of the conductive wire A (in a direction the same as the direction in which the conductive wire A is extended into the lateral socket 221 as shown in FIG. 5). Accordingly, the conductive wires A can tightly attach to the electro-conductive plate 21 of the electro-conductive module 2 (and electrically connect with each other via the electro-conductive plate 21 of the electro-conductive module 2). Also, the hook section 321 of the shift section 32 is engaged into the insertion sink 151 of the recessed section 15 and located therein. In the above structure, the slide guide slot 225 for guiding the pin 34 is formed on the metal-made lateral support 22 (the support section 223).

Therefore, the slide guide slot 225 has better structural strength and is able to more precisely and securely guide the pin 34. Moreover, the structure arrangement in the internal space of the case main body is simplified. Furthermore, during the process that the rotary button 3 drives the abutment leaf spring 4 to engage with the conductive wire A, the position where the movable section 33 abuts against the drive section 42 is gradually changed from a position near the bending section 41 to a position near the outer end section of the drive section 42 (away from the bending section 41). Therefore, the arm of the operation force applied by the movable section 33 of the rotary button 3 to the drive section 42 is gradually increased. Accordingly, the moving direction of the rotary button 3 or the movable section 33 is reverse to the moving direction of the set of the abutment leaf springs 4 or the drive section 42 and the engagement section 43. Therefore, the operation force required for driving the abutment leaf spring 4 to pivotally rotate is gradually reduced. As a result, the operation can be performed with less strength and the rotary button 3 can be more smoothly moved.

In practice, during the process that the rotary button 3 drives the abutment leaf spring 4 to engage with the conductive wire A, the drive section 42 is also pivotally rotated with the second shaft rod 13 serving as the rotational center. Therefore, the drive section 42 can be properly designed with such a configuration that after the outer end section of the engagement section 43 is engaged with the surface of the conductive wire A, the outer end section of the drive section 42 is also engaged with the surface of the conductive wire A in cooperation with the elastic deformation of the abutment leaf spring 4 itself. In this case, the drive section 42 and the engagement section 43 can respectively engage with different portions of the surface of the conductive wire A to achieve a multi-engagement system. Accordingly, a better engagement effect for the conductive wire A can be achieved.

Figure 6:
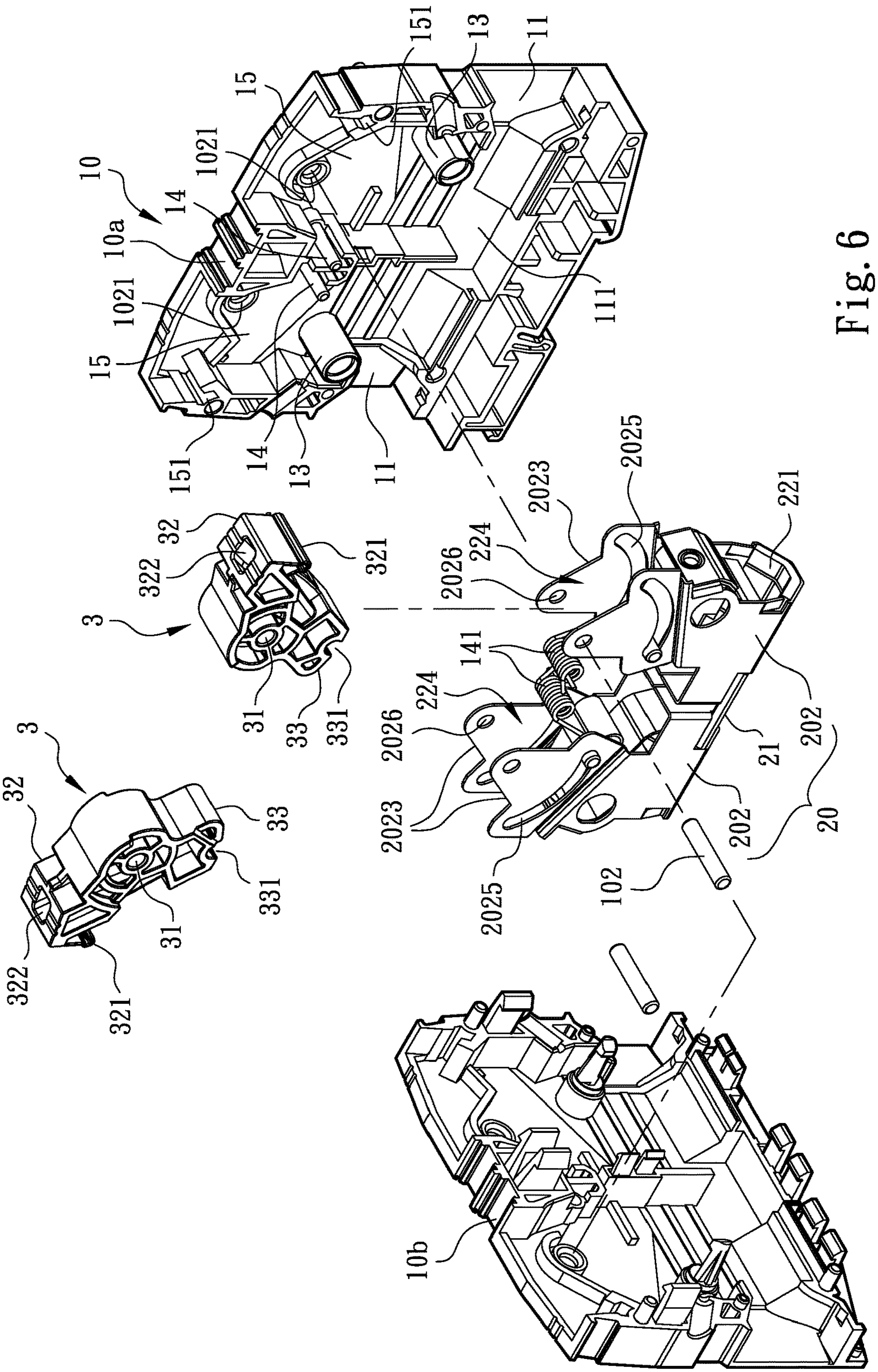
FIG. 6 is a perspective exploded view of a second embodiment of the present invention.
Figure 7:
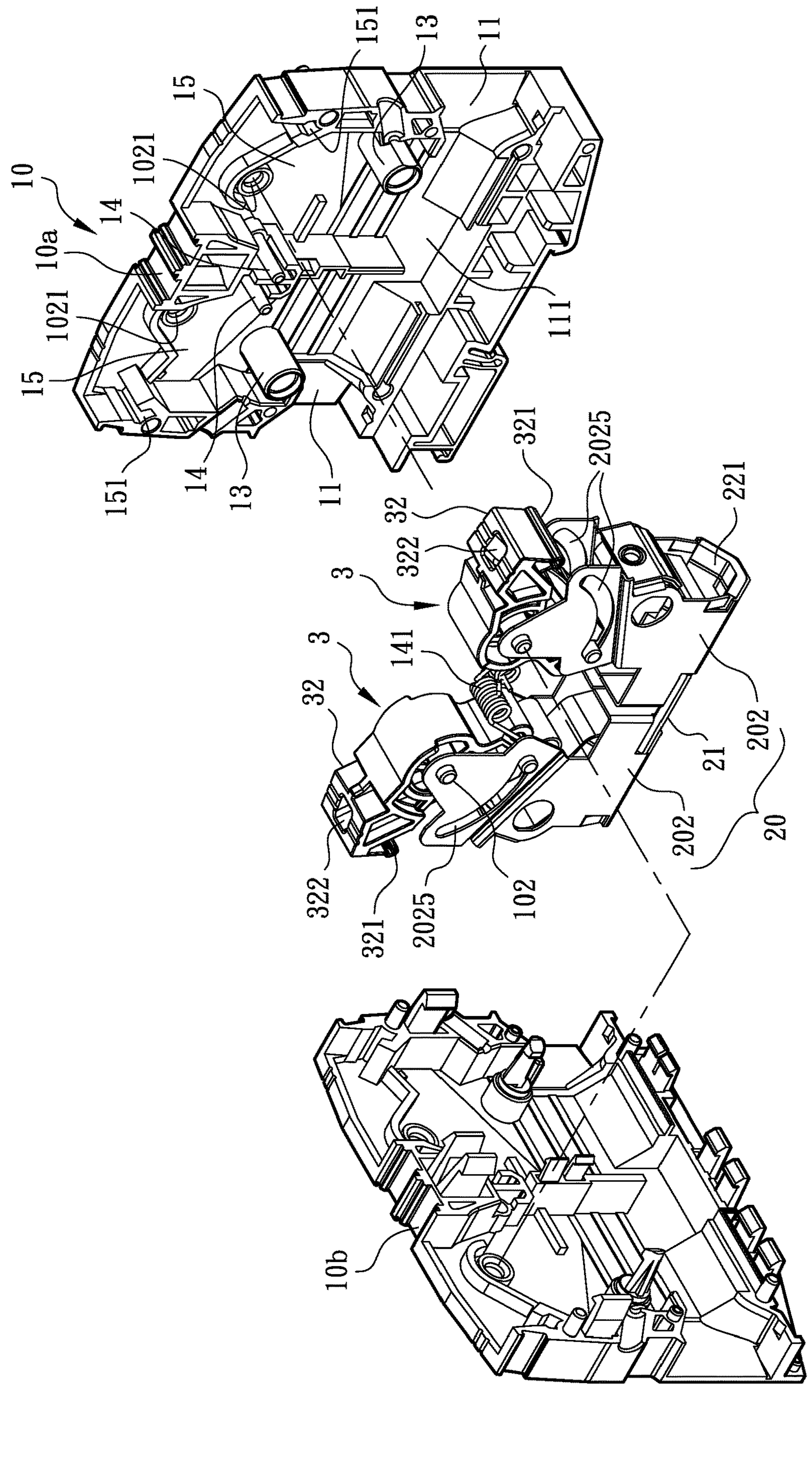
FIG. 7 is a perspective partially assembled view of the second embodiment of the present invention.

Please now refer to FIGS. 6 and 7. According to a second embodiment, the wire connection terminal structure of the present invention includes a case main body 10, an electro-conductive module 20 and a rotary button 3 and an abutment leaf spring 4 (not shown) identical to the rotary button 3 and the abutment leaf spring 4 of the first embodiment. The case main body 10 is composed of two half case bodies **10*a*, 10*b* opposite to each other. A receiving section 111, a recessed section 15 and a wire plug-in port 11 are formed in the case main body 1 as the first embodiment. A second shaft rod 13, a support rod 14 and an insertion sink 151 are disposed in the recessed section 15. The second embodiment is different from the first embodiment in that a shaft rod socket 1021 is further disposed in the recessed section 15 for a first shaft rod 102** to insert therein.

The electro-conductive module 20 is disposed in the receiving section 111 of the case main body 10. The electro-conductive module 20 is composed of an electro-conductive plate 21 identical to the electro-conductive plate 21 of the first embodiment and at least one lateral support 202 assembled on a lateral side of the electro-conductive plate 21. The lateral support 202 has a lateral socket 221 connected with the wire plug-in port 11. At least one (or two parallel) support sections 2023 are disposed on two sides of the lateral socket 221. Two (symmetrical) slide guide slots 2025 are (respectively) formed on the support sections 2023. In addition, a perforation 2026 is formed on each support section 2023 for the first shaft rod 102 to pivotally fit therein. The slide guide slots 2025 can have the form of a closed structure (or a partially open structure). In addition, a receiving space 224 is defined in the lateral support 202 in communication with the lateral socket 221.

When assembled, the rotary button 3 and the abutment leaf spring 4 are assembled on the electro-conductive module 20 in the same positions and by the same way as the first embodiment. Then, the first shaft rod 102 is sequentially passed through the perforations 2026 of the support sections 2023 and the shaft hole 31 of the rotary button 3 and then inserted into the shaft rod socket 1021 in the recessed section 15. Accordingly, the electro-conductive module 20, the rotary button 3 and the abutment leaf spring 4 can be assembled in the case main body 10 (by the same way as the first embodiment) with the shift section 32 of the rotary button 3 exposed to the outer side of the recessed section 15. The second embodiment provides another assembling structure in another form. The first shaft rod 102 is inserted and assembled in the shaft rod socket 1021 and passed through the perforations 2026 of the support sections 2023 to help the lateral support 202 (the support sections 2023) in forming a securer assembling structure. As a whole, the operation manner of the second embodiment and the effect achieved by the second embodiment are both the same as the first embodiment and thus will not be redundantly described hereinafter.

In conclusion, the wire connection terminal structure of the present invention can truly achieve the effects that the operation is performed with less strength, the structural strength is enhanced and the guide system is more precise and securer. The wire connection terminal structure of the present invention is novel, advanced and inventive.

The above embodiments are only used to illustrate the present invention, not intended to limit the scope thereof. Many modifications of the above embodiments can be made without departing from the spirit of the present invention.

What is claimed is:

1. A wire connection terminal structure, comprising:

a case main body, wherein a recessed section and a wire plug-in port are formed on an inner surface of the case main body, and a first shaft rod is disposed in the recessed section of the case main body for extending axially with respect to an inner wall surface of said recessed section;

an electro-conductive module connected with the wire plug-in port and being formed with a pair of substantially-parallel support sections, each of the support sections extends away from a base portion of the electro-conductive module, and at least one slide guide slot is completely formed on a corresponding wall surface of a respective one of the support sections to thereby be fully physically spaced from the inner wall surface of the recessed section of the case main body, wherein the at least one slide guide slot extends between two opposing closed ends;

at least one rotary button pivotally disposed in the recessed section of the case main body via the first shaft rod, the at least one rotary button being formed with a shift section exposed to an outer side of the case main body and a movable section extending towards the base portion of the electro-conductive module, and a pin being disposed in the movable section and extending into the at least one slide guide slot for being freely movably guided thereby, wherein movement of the pin with respect to a corresponding one of the support sections is restricted by the opposing closed ends of the respective at least one slide guide slot; and at least one abutment leaf spring pivotally disposed between the at least one rotary button and the base portion of the electro-conductive module, and the at least one abutment leaf spring being driven by the at least one rotary button to pivotally rotate.

2. The wire connection terminal structure as claimed in claim 1, wherein two sets of symmetrical recessed sections and wire plug-in ports are formed on the inner surface of the case main body and the electro-conductive module is connected and disposed between the two wire plug-in ports, wherein lateral sockets are, respectively, formed on two lateral sides of the electro-conductive module and are, respectively, connected with the two wire plug-in ports for receiving two conductive wires plugged from the outer side of the case main body through a corresponding one of the two wire plug-in ports into the two recessed sections, wherein two rotary buttons are, respectively, symmetrically disposed in the two recessed sections and two abutment leaf springs are, respectively, symmetrically pivotally disposed between the two rotary buttons and the electro-conductive module, and wherein each of the two abutment leaf springs are drivable by a corresponding one of the two rotary buttons to pivotally rotate for pressing the two conductive wires against the electro-conductive module whereby the two conductive wires are electrically connected with each other via the electro-conductive module.

3. The wire connection terminal structure as claimed in claim 1, wherein an insertion socket is formed on the shift section of the at least one rotary button for a tool to be inserted therein, and wherein a holding channel is formed on the movable section of the at least one rotary button for holding the pin.

4. The wire connection terminal structure as claimed in claim 3, wherein a support rod and an insertion sink are disposed in the recessed section and an elastic member is pivotally fitted on the support rod for elastically abutting against the at least one rotary button and thereby the shift section protrudes out of the case main body, and wherein a hook section is disposed on the shift section, the hook section being receivable in the recessed section with the shift section for being engaged in the insertion sink.

5. The wire connection terminal structure as claimed in claim 1, wherein the at least one abutment leaf spring is pivotally disposed in the case main body via a second shaft rod serving as a pivotally rotational center for the at least one abutment leaf spring, and during rotation of the at least one rotary button for driving the at least one abutment leaf spring, the movable section of the at least one rotary button is gradually displaced from a section of the at least one abutment leaf spring adjacent the pivotally rotational center to an outer lateral side whereby an arm of operation force applied by the at least one rotary button to drive the at least one abutment leaf spring is gradually increased.

6. The wire connection terminal structure as claimed in claim 5, wherein a middle section of the at least one abutment leaf spring is formed with an arcuate bending section, and an inner side of the bending section being pivotally fitted on the second shaft rod whereby the at least one abutment leaf spring is pivotally rotatably assembled on the second shaft rod, and two ends of the bending section being, respectively, formed with a drive section in contact with the movable section of the at least one rotary button and an engagement section proximal to the electro-conductive module.

7. The wire connection terminal structure as claimed in claim 6, wherein the at least one abutment leaf spring includes multiple overlapped abutment leaf springs being formed with an identical bending configuration, and at least an outer end section of the engagement section of the at least one abutment leaf spring being formed with a forked structure.

8. The wire connection terminal structure as claimed in claim 1, wherein the electro-conductive module includes an electro-conductive plate and a lateral support disposed on a lateral side of the electro-conductive plate, and the lateral support being formed with a lateral socket connected with the wire plug-in port, wherein each of the support sections is disposed on a corresponding one of two sides of the lateral socket, thereby a corresponding one of the at least one slide guide slot is symmetrically formed on a respective one of the support sections.

9. The wire connection terminal structure as claimed in claim 8, wherein a perforation is formed on each of the support sections and a shaft rod socket is formed in the recessed section of the case main body, and wherein the first shaft rod passes through each perforation of the support sections and the rotary button for being inserted into the shaft rod socket to thereby extend axially with respect to the inner wall surface of said recessed section whereby the electro-conductive module, the at least one rotary button, and the at least one abutment leaf spring, are assemblable in the case main body.

10. The wire connection terminal structure as claimed in claim 8, wherein the electro-conductive plate and the lateral support of the electro-conductive module are integrally formed with respect to one another.

11. The wire connection terminal structure as claimed in claim 8, wherein an opening is formed through the lateral support for communication with the lateral socket, and wherein a lateral side of the electro-conductive plate is fitted in the opening whereby the lateral support is connected with the electro-conductive plate.

12. The wire connection terminal structure as claimed in claim 1, wherein the at least one slide guide slot is hollow and is formed with a closed arcuate configuration.

13. The wire connection terminal structure as claimed in claim 12, wherein two sets of symmetrical recessed sections and wire plug-in ports are formed on the inner surface of the case main body and the electro-conductive module is connected and disposed between the two wire plug-in ports, wherein lateral sockets are, respectively, formed on two lateral sides of the electro-conductive module and are, respectively, connected with the two wire plug-in ports for receiving two conductive wires plugged from the outer side of the case main body through a corresponding one of the two wire plug-in ports into the two recessed sections, wherein two rotary buttons are, respectively, symmetrically disposed in the two recessed sections and two abutment leaf springs are, respectively, symmetrically pivotally disposed between the two rotary buttons and the electro-conductive module, and wherein each of the two abutment leaf springs are drivable by a corresponding one of the two rotary buttons to pivotally rotate for pressing the two conductive wires against the electro-conductive module whereby the two conductive wires are electrically connected with each other via the electro-conductive module.

14. The wire connection terminal structure as claimed in claim 12, wherein the at least one abutment leaf spring is pivotally disposed in the case main body via a second shaft rod serving as a pivotally rotational center for the at least one abutment leaf spring, and during rotation of the at least one rotary button for driving the at least one abutment leaf spring, the movable section of the at least one rotary button is gradually displaced from a section of the at least one abutment leaf spring adjacent the pivotally rotational center to an outer lateral side whereby an arm of operation force applied by the at least one rotary button to drive the at least one abutment leaf spring is gradually increased.

15. The wire connection terminal structure as claimed in claim 14, wherein a middle section of the at least one abutment leaf spring is formed with an arcuate bending section, and an inner side of the bending section being pivotally fitted on the second shaft rod whereby the at least one abutment leaf spring is pivotally rotatably assembled on the second shaft rod, and two ends of the bending section being, respectively, formed with a drive section in contact with the movable section of the at least one rotary button and an engagement section proximal to the electro-conductive module.

16. The wire connection terminal structure as claimed in claim 15, wherein the at least one abutment leaf spring includes multiple overlapped abutment leaf springs being formed with an identical bending configuration, and at least an outer end section of the engagement section of the at least one abutment leaf spring being formed with a forked structure.

17. The wire connection terminal structure as claimed in claim 15, wherein the electro-conductive module includes an electro-conductive plate and a lateral support disposed on a lateral side of the electro-conductive plate, and the lateral support being formed with a lateral socket connected with the wire plug-in port, wherein each of the support sections is disposed on a corresponding one of two sides of the lateral socket, thereby a corresponding one of the at least one slide guide slot is symmetrically formed on a respective one of the support sections.

18. The wire connection terminal structure as claimed in claim 17, wherein a perforation is formed on each of the support sections and a shaft rod socket is formed in the recessed section of the case main body, and wherein the first shaft rod passes through each perforation of the support sections and the rotary button for being inserted into the shaft rod socket to thereby extend axially with respect to the inner wall surface of said recessed section whereby the electro-conductive module, the at least one rotary button, and the at least one abutment leaf spring, are assemblable in the case main body.

19. The wire connection terminal structure as claimed in claim 17, wherein the electro-conductive plate and the lateral support of the electro-conductive module are integrally formed with respect to one another.

20. The wire connection terminal structure as claimed in claim 17, wherein an opening is formed through the lateral support for communication with the lateral socket, and wherein a lateral side of the electro-conductive plate is fitted in the opening whereby the lateral support is connected with the electro-conductive plate.

21. The wire connection terminal structure as claimed in claim 15, wherein an insertion socket is formed on the shift section of the at least one rotary button for a tool to be inserted therein, and wherein a holding channel is formed on the movable section of the at least one rotary button for holding the pin.

22. The wire connection terminal structure as claimed in claim 21, wherein a support rod and an insertion sink are disposed in the recessed section and an elastic member is pivotally fitted on the support rod for elastically abutting against the at least one rotary button and thereby the shift section protrudes out of the case main body, and wherein a hook section is disposed on the shift section, the hook section being receivable in the recessed section with the shift section for being engaged in the insertion sink.

* * * * *